United States Patent
Adachi

[11] 3,712,711
[45] Jan. 23, 1973

[54] TRIPLE-LAYER ANTI-REFLECTION COATING DESIGN

[75] Inventor: Iwao P. Adachi, Lexington, Mass.

[73] Assignee: Itek Corporation, Lexington, Mass.

[22] Filed: Jan. 10, 1969

[21] Appl. No.: 790,342

[52] U.S. Cl. .................. 350/164, 117/33.3, 117/69, 117/106 R, 117/124 A
[51] Int. Cl. ................................................ G02b 1/10
[58] Field of Search...117/33.3, 124, 106, 70, 124 A, 117/106 E; 350/163, 164, 165, 166, 162

[56] References Cited

UNITED STATES PATENTS

| | | | |
|---|---|---|---|
| 3,421,810 | 1/1969 | Edwards et al. | 350/166 |
| 3,421,811 | 1/1969 | Edwards et al. | 350/166 |
| 2,552,184 | 5/1951 | Koch | 117/33.3 X |
| 2,552,185 | 5/1951 | Koch | 117/33.3 X |
| 2,624,238 | 1/1953 | Widdop et al. | 117/33.3 X |
| 2,628,927 | 2/1953 | Colbert et al. | 117/33.3 X |
| 2,676,117 | 4/1954 | Colbert et al. | 117/33.3 X |
| 2,758,510 | 8/1956 | Auwarter | 350/166 |
| 2,782,676 | 2/1957 | Osterberg | 350/164 |
| 2,834,689 | 5/1958 | Jupnik | 117/33.3 |
| 2,932,592 | 4/1960 | Cameron | 117/33.3 X |
| 3,176,575 | 4/1965 | Socha | 117/33.3 X |
| 3,185,020 | 5/1965 | Thelen | 117/33.3 X |

FOREIGN PATENTS OR APPLICATIONS 991,635  5/1965  Great Britain.......................350/164

*Primary Examiner*—William D. Martin
*Assistant Examiner*—William H. Schmidt
*Attorney*—Homer O. Blair and Robert L. Nathans

[57] ABSTRACT

An optical element such as a lens has a triple layer anti-reflection coating having a very thin, high refractive index middle layer. The middle layer is matched and provides a broadened spectral response, yet significantly reduces absorption, scattering and reflections even with incident angle variations.

7 Claims, 1 Drawing Figure

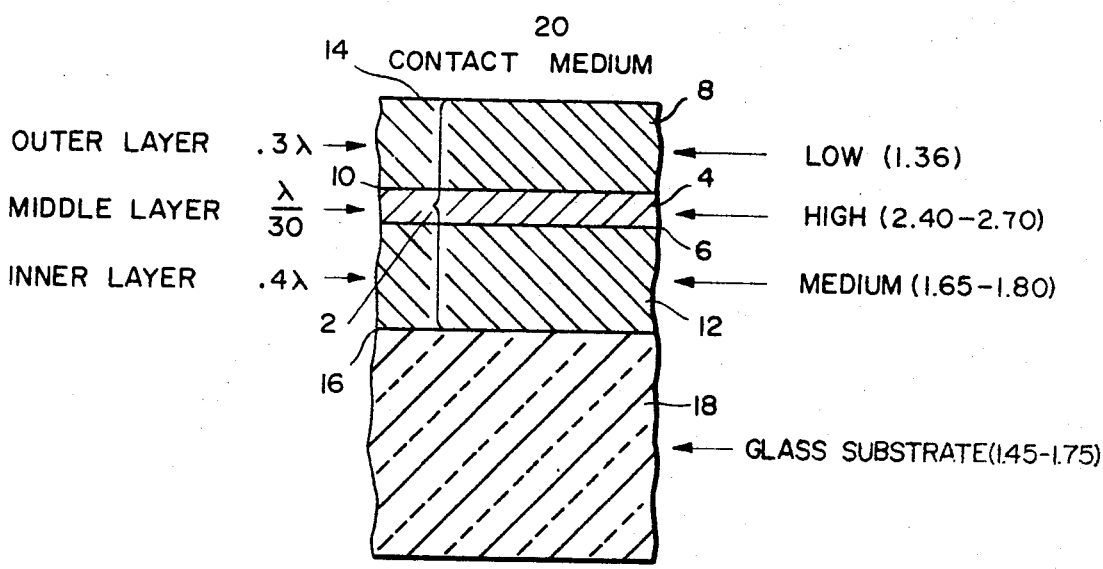

TRIPLE-LAYER ANTI-REFLECTION COATING DESIGN

BACKGROUND OF THE INVENTION

1. Field of the Invention

This invention relates to a coating for an optical element such as a lens. It relates more specifically to an improved anti-reflection coating deposited on a reflective substrate and a method of making same.

2. Description of the Prior Art

Triple layer anti-reflection coatings presently being used have a middle layer whose optical thickness is specifically selected to be one-half the wavelength of the incident light. The reason for this is so that the optical thickness of the inner and outer layers will be unaffected. Therefore, the introduction of the one-half wavelength middle layer has served only to broaden the low reflectance response range.

A thick middle layer having an optical thickness of one-half wavelength is sensitive to light striking the coating at various angles; it is therefore limited in application to near normal incidence. As the angle of incidence of the light varies from the normal, the reflected waves must travel a total distance increasingly greater than the wavelength in the middle layer. The added distance travelled causes phase changes, with the result that the middle layer does not provide the desired destructive interference pattern needed for an efficient anti-reflection coating. Therefore, when using conventional coatings, employing a one-half wavelength middle layer, the angle of incidence is critical; there must not be too great a deviation from near normal incidence.

A middle layer having a large optical thickness, e.g., one-half wavelength and a high index of refraction, is further disadvantaged in that it causes significant scattering of the light which is transmitted or reflected in the middle layer. This results from the reradiation of the light waves which make contact with the molecules of the middle layer. Thus, some light energy is lost from the incident wave and it may also undergo frequency changes based on the Raman effect.

A further problem arises because most of the absorption losses occur in the layer having the highest index of refraction. Thus, a one-half wavelength middle layer provides a large thickness through which the light must pass and accounts for a significant part of the reduction in the amount of light transmitted to the inner layer.

SUMMARY OF THE INVENTION

Briefly, the present optical coating for a lens or other such optical element also comprises three layers. However, the middle coating, instead of being the usual one-half wavelength in optical thickness, is very thin, on the order of 0.03λ. In addition, it has a high index of refraction on the order of 2.40 – 2.70, as compared with the other two layers and the lens itself. The utilization of such a very thin high index middle layer yields the same advantages vis-a-vis broadening the low reflective response of the coating as a conventional one-half wavelength layer. At the same time, however, it markedly reduces the sensitivity of the coating to variations in the angle of incidence of the incoming light. Moreover, it minimizes undesirable optical effects stemming from absorption and scattering in the middle layer.

BRIEF DESCRIPTION OF THE DRAWING

The FIGURE is an enlarged sectional view showing the arrangement and approximate optical parameter of a triple layer anti-reflection coating made and deposited on a glass substrate in accordance with this invention.

DESCRIPTION OF THE PREFERRED EMBODIMENT

Referring in greater detail to the drawing, the entire triple layer anti-reflection coating is designated by the reference 2, deposited upon and adhered to the surface 16 of a glass optical element 18 such as a lens, prism or the like. In complete contrast to prior triple layer coatings of this type, the anti-reflection coating 2 has a very thin middle layer 4 whose optical thickness is only a small fraction, e.g. 0.03λ of the central wavelength of the light spectrum which the optical element is designed to pass, e.g. 5000A. Layer 4 has a high refractive index, e.g. between 2.4 – 2.7, and provides the same low reflectance response as the prior art half wavelength middle layer. That is, coating 2 provides approximately the same widened spectral response, while maintaining the desired destructive interference patterns which are necessary for an effective anti-reflection coating. In addition, however, utilization of the thin high refractive index middle layer 4 does away with the undesirable optical effects attendant prior coatings caused by reflection, adsorption and scattering in the middle layer.

The portion of the light which is transmitted through layer 4 is reflected from the middle-inner layer interface 6. Since layer 4 is very thin, the reflected light travels only a very small total distance, approximately 0.06λ, i.e. twice the thickness of layer 4. Light travelling such a very small fraction of a wavelength behaves optically the same as light travelling through an optical thickness of one whole wavelength in determining reflectance characteristics. That is, transmission through layer 4 produces essentially no phase change in the light reflected at interface 6 relative to the light incident on layer 4.

Also, light travelling from a medium having a lower index of refraction to a medium having a higher index of refraction will undergo a phase change when reflected from the interface of these mediums. Thus, the higher index of refraction of layer 4 causes a phase change in the light passing through layer 8 which is reflected from layer interface 10. However, no phase change occurs in that portion of the light reflected from layer interface 6. This results from the fact that the light is passing from a medium having a higher index of refraction, the middle layer 4, to a medium having a lower index of refraction, the inner layer 12. Comparing the refractive indexes at the other two interfaces will show that light reflected from the contact medium-outer layer interface 14 undergoes a phase change because the light has passed from a less dense to a more dense optical medium, while the light reflected from the inner layer-glass interface 16, a more dense to a less dense medium, does not undergo a phase change. The optical thickness of each of the three layers is chosen empirically and acts in conjunction with the refractive indexes to provide this desired destructive interference effect at the contact medium-outer layer interface 14 while providing a broad band, low reflectance response.

When the middle layer 4 is made very thin (approximately 0.03λ) the distance traveled in the middle layer 4 by light waves having various angles of incidence approaches the distance traveled by light waves of normal incidence. Also, the middle layer 4 is chosen to have such a high index of refraction (2.4 – 2.7) which causes the transmitted portion of the light to bend toward the normal. Thus, a very thin middle layer 4 having a high refractive index results in a triple layer coating 2 which is less sensitive to incident angle variations.

Scattering is also reduced by properly controlling the thickness of the middle layer 4. Most scattering occurs in the layer having the highest index of refraction. A very thin middle layer 4 reduces the distance through which the light can be scattered before reaching the middle-inner layer interface 6.

Absorption is also reduced by making the middle layer 4 very thin. The amount of absorption loss is directly related to the refractive index of the medium and to its thickness. When the middle layer 4 is made very thin, there is less material in which absorption can occur. Thus, this very thin middle layer 4 has a higher transmission to absorption ratio than a thicker middle layer of the same or similar refractive index.

The inner layer 12 is chosen to have a refractive index in the range of 1.65 – 1.80 and an optical thickness of approximately .4λ to properly match the middle layer 4 and the glass substrate 18 for minimum reflection. Magnesium oxide or aluminum oxide can be used to obtain an inner layer 12 having an index of refraction within the desired range. As an example, when the middle layer is designed to transmit a spectrum having a central wavelength of 5,000 A., the inner layer will have a design wavelength of 5,500 A. The optical thickness of the inner layer 12 is chosen so that this layer will, when matched to the middle layer 4 and glass substrate 18, function like a quarterwave layer in minimizing reflection.

The outer layer 8 has a low refractive index (1.36) and an optical thickness of .3λ to match the contact or external medium 20 (air) to the middle layer 4 for minimum reflectance. The mineral cryolite, well known in the optical field, or a mixture of cryolite with magnesium fluoride can be used to obtain an outer layer 8 with this low refractive index. As an example, when the middle layer is designed to transmit a spectrum having a central wavelength of 5,000 A, the outer layer will have a design wavelength of 5,500 – 5,600 A. The optical thickness of the outer layer is chosen so that this layer will, when matched to the contact medium 20 and middle layer 4, function like a quarterwave layer in minimizing reflection.

It is practical to obtain the proper relation between the optical parameters of the three layers empirically. As an example, an optical element comprising a glass substrate having an index of refraction of 1.51, an inner layer having an optical thickness of .387λ and refractive index of 1.700, a middle layer having an optical thickness of .037λ and refractive index of 2.450, and an outer layer having an optical thickness of .29λ and a refractive index of 1.360 achieved the stated objects excellently while providing a very small percentage of reflectance. At 4,000A the percentage of reflectance was approximately .24 percent, while at 5,000A approximately .28 percent, and at 6,000A approximately .26 percent.

It should also be noted that the higher the index of refraction of the glass substrate used, the easier it is to match the three layers, thereby the objects of the invention are more precisely achieved.

This novel triple layer anti-reflection coating is deposited on a substrate to the desired optical thickness by utilizing an evaporation-monitoring technique. A monochromator is used to obtain light of a known wavelength to provide the desired design wavelength for each layer. For example, if it is desired to minimize reflection over a bandwidth of 3,000A to 7,000A, the inner layer is evaporated onto the substrate, and its optical thickness monitored to approximately 0.4 of the design wavelength of the reflected light, which here is chosen to be 5,500A. Likewise, the middle layer is evaporated onto the inner layer, and its optical thickness monitored to approximately 0.03 of the central wavelength of the reflected light, here 5,000A. The outer layer is then evaporated onto the middle layer, and its optical thickness is monitored to approximately 0.3 the design wavelength of the reflected light, which here is chosen to be 5,500 – 5,600A.

Thus, through this evaporation-monitoring technique, the triple layer anti-reflection coating is accurately and quickly built up on the substrate, each layer being deposited to the desired optical thickness.

It will thus be seen that the objects set forth above, among those made apparent from the preceding description, are efficiently attained and, since certain changes may be made in carrying out the above method and the article set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. An optical element comprising, in combination,
   A. a substrate to which it is desired to transmit maximum light from an external medium,
   B. an anti-reflection transparent coating between said substrate and said external medium, said coating having only three layers comprising,
   1. a middle layer having
      a. an optical thickness no greater than a small fraction of the wavelength of light to be passed, and
      b. a high refractive index for such light,
   2. an inner layer between said middle layer and said substrate having
      a. an optical thickness and refractive index to match the middle layer to said substrate, and
   3. an outer layer between said external medium and said middle layer, said outer layer having
      a. an optical thickness and refractive index to match the surrounding medium to said middle layer.

2. The combination of claim 1 in which the refractive index of the middle layer is in the range of 2.40 – 2.70.

3. The combination of claim 2 in which the optical thickness of the middle layer is approximately $0.03\lambda$.

4. The combination of claim 3 in which the inner layer has a refractive index of $1.65 - 1.80$ and an optical thickness of approximately $.4\lambda$.

5. The combination of claim 4 in which the outer layer has a refractive index of approximately 1.36 and an optical thickness of approximately $.3\lambda$.

6. The combination of claim 5 in which the triple layer anti-reflection coating is deposited on a glass substrate having an index of refraction between $1.45 - 1.75$.

7. An optical element comprising, in combination,
A. a glass substrate with an index of refraction of approximately 1.51,
B. a first layer of anti-reflection coating having an index refraction of approximately 1.700 and an optical thickness of approximately $.387\lambda$ applied to said substrate,
C. a second layer of anti-reflection coating having an index of refraction of approximately 2.450 and an optical thickness of approximately $.037\lambda$ applied to said first layer, and
D. a third layer of anti-reflection coating having an index of refraction of approximately 1.36 and an optical thickness of approximately $.29\lambda$ applied to said second layer.

* * * * *